UNITED STATES PATENT OFFICE.

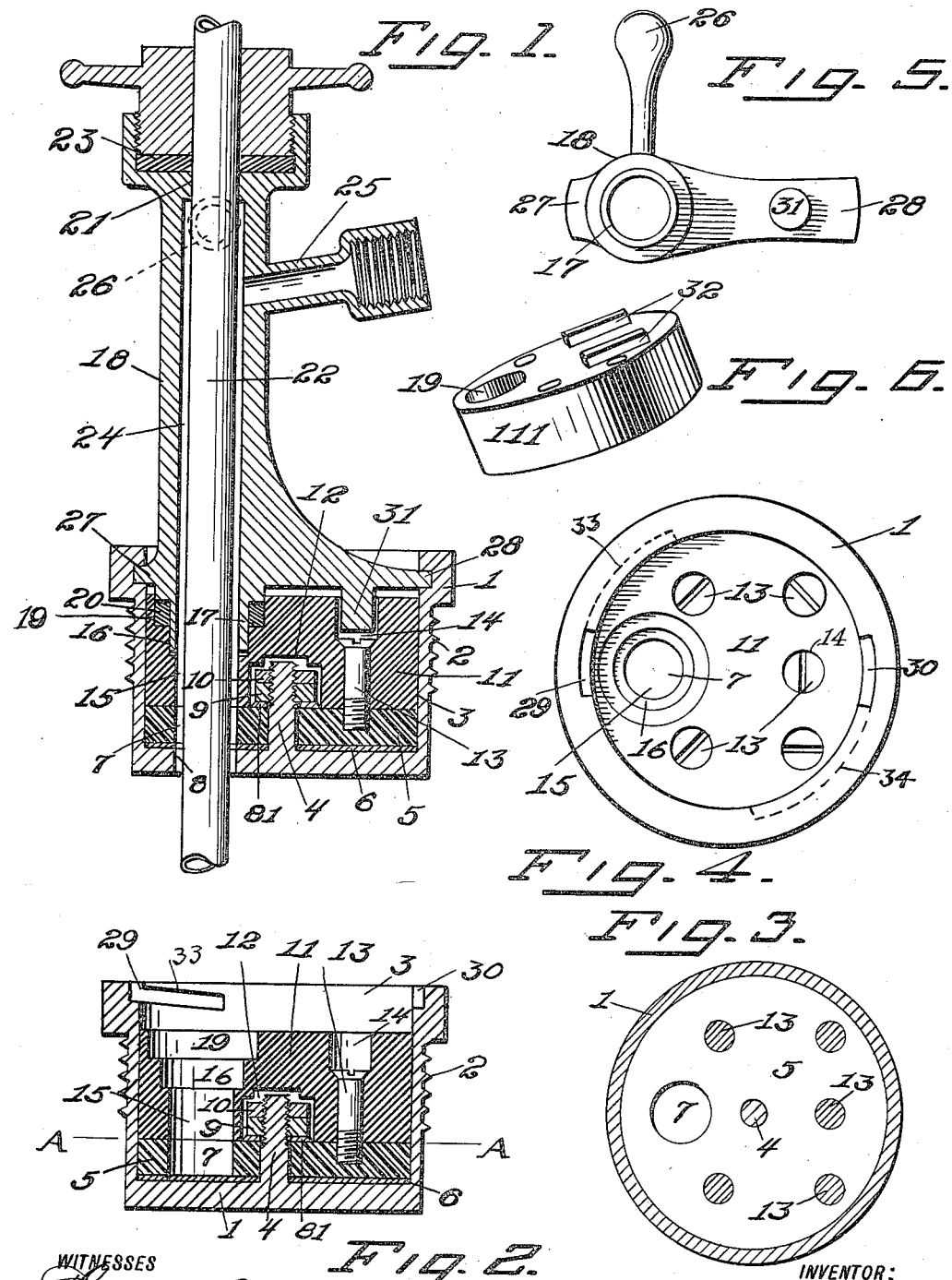
D. BEEBE.
FAUCET BUNG.
APPLICATION FILED MAY 10, 1912.
1,080,805. Patented Dec. 9, 1913.

DILLON BEEBE, OF NEWARK, NEW JERSEY.

FAUCET-BUNG.

1,080,805.

Specification of Letters Patent. Patented Dec. 9, 1913.

Application filed May 10, 1912. Serial No. 696,343.

*To all whom it may concern:*

Be it known that I, DILLON BEEBE, a citizen of the United States, residing at Newark, in the county of Essex and State of New Jersey, have invented certain Improvements in Faucet-Bungs, of which the following is a specification.

This invention relates more particularly to a faucet bung for the single opening of a barrel or other package of beer or similar liquid, and to which faucet bung a tap can be applied to admit air pressure and at the same time afford a discharge or outlet for the liquid.

The objects of the invention are to secure compactness and simplicity of construction and operation; to secure an impervious closure of the barrel when the valve of the faucet bung is shut and to prevent leakage of either air pressure or liquid when the valve is open; to provide an air passage in the bung which is a continuation of the air passage of the tap, and to confine the air pressure and any small quantities of liquid to said passage; to obtain a construction which can be readily taken apart and put together again, without removing the bung body or bushing from the barrel, and to secure other advantages and results as may be brought out in the following description.

Referring to the accompanying drawings, in which like numerals of reference indicate the same parts throughout the several figures, Figure 1 is a central section of my improved faucet bung with a tap in engagement therewith and the valve opened; Fig. 2 is a similar section, taken on the same plane with respect to the valve, showing the tap removed and the valve in closed position; Fig. 3 is a section on line A—A of Fig. 2; Fig. 4 is a plan of the faucet bung as shown Fig. in Fig. 2; Fig. 5 is an underneath or face view of the tap; Fig. 6 is a perspective view of the outer portion of the valve illustrating a slight modification in the means for engagement by the tap to turn the valve.

In said drawings, 1 indicates the body portion or bushing of my improved bung having exterior threads 2 to screw into a package and being interiorly chambered or cup-shaped, as at 3. From the floor of said chamber 3 a central integral projection 4 extends upward, and pivotally mounted on said projection is a valve 5. Said projection 4 is thus a component part of the bushing 1, so that it is an extension of the inner surface of the cup-shaped bushing, and any movement or looseness of one with respect to the other is impossible. The valve 5 may have any suitable facing 6 or be otherwise adapted to form an impervious joint with the floor of the bung chamber, and it will be understood that said valve 5 and the floor of the chamber have apertures 7 and 8, respectively, which are adapted to be brought into registration as shown in Fig. 1, or out of registration as shown in Fig. 2 by turning the said valve 5. The said projection 4 has on its upper or outer end above the valve 5 a washer 81, nut 9 and lock nut 10, the projection and nuts being threaded so that the said valve 5 can be seated with any desired degree of pressure. Superposed upon the valve 5 is an outer portion 11 comprising a plate recessed as at 12 to accommodate the said nuts, washer and end of the projection 4, and held in fixed impervious relation to the valve 5 by screws 13. Preferably, the heads of said screws 13 are countersunk in the valve plate, as at 14, to reduce weight and prevent tampering. The outer portion 11 has an opening 15 in alinement with the opening 7 of the valve, and from about the middle of the depth of said opening the same is enlarged, as at 16, to receive the end 17 of the tap 18, the extreme outer end of said enlargement of the opening being again enlarged as at 19 to form an annular recess for packing 20 on said tap, whereby the tap will make a tight joint with the outer portion 11 of the valve.

The tap or faucet which I have shown comprises a body portion having a tubular slideway 21 for the tap rod 22 and being provided at its upper end with suitable packing means 23 for insuring an impervious closure around the said rod 22. The lower end portion of the tap or faucet has the tubular slideway enlarged, as at 24, to form an annular flow passage for the air-pressure which is admitted through a laterally projecting branch 25. This branch connection 25 affords a handle, and preferably another handle 26 projects laterally from the body portion of the tap at about the same height.

Near its lower reduced end 17 which enters the faucet bung, the body portion of the tap has diametrically opposite laterally projecting lugs 27 and 28, which are adapted at their extremities to enter slots 29, 30 in the inner walls of the bung body 1, and which slots connect with opposite grooves 33, 34 inclined spirally downward toward the valve in the bung body, as is common. It will be understood that the lugs 27, 28 drop into these slots 29, 30 as the tap or faucet is inserted in the bung, and that as the tap or faucet is twisted or turned to slide said lugs along the inner inclined grooves 33, 34, the tap is forced into impervious engagement, at its packing 20, with the outer portion of the valve. As the tap is thus turned into position, it is desirable to positively insure turning of the valve at the same time into open position, and this I have shown accomplished by a projection 31 on the under side of the lug 28 adapted to enter one of the countersinks 14 in the valve plate or outer portion of the valve. Other means might be provided for this engagement, however, such as the two ribs 32, 32, which I have shown upon the top of an outer portion 111 in Fig. 6, and which ribs are adapted to lie one at each side of the lug 28 on the tap or faucet.

It will be understood that after the tap or faucet is turned into locked engagement with the bung and the valve of said bung thus opened, the tap rod 22 is pushed down into the valve, so that the air pressure admitted around the same can force the liquid out through it.

By my improved construction the projection 4 is a component part of the cup-shaped bushing 1, and yet protected by the outer valve portion 11 so that it will not be injured and the bushing ruined. Obviously, if such projection was exposed to the blows and wear of usage and handling of the package, it would very likely become damaged, and since it could not be removed from the bushing or body portion 1 and replaced by another, the entire bushing would be lost. It is therefore of great importance in such a construction as mine to protect the projection as I have done.

Having thus described the invention, what I claim is—

1. In a faucet bung for barrels and similar packages, the combination with a cup-shaped bushing formed with a central integral projection rising upward from the bottom of its inner surface and with an eccentric opening in its bottom, said bushing having opposite inclined grooves in its inner side walls and being threaded on its outer side walls, a valve disk with a central aperture adapted to be held and ride rotatively upon said projection of said bushing, and means upon the outer end of said projection for securing said valve disk with an impervious bearing against the floor of the bushing, said valve disk having an eccentric aperture adapted to register with said opening in the bottom of the bushing, of an outer valve portion covering said projection and securing means and adapted to receive a tap or faucet, said outer valve portion exposing the said inclined grooves of the bushing, and means for securing said outer valve portion fixedly and detachably to said valve disk.

2. In a faucet bung for barrels and similar packages, the combination with a cup-shaped bushing exteriorly threaded and having a central projection rising upward from the bottom of its inner surface, said bushing having an eccentric opening in its bottom and opposite inclined grooves in its side wall, a valve disk rotatably mounted on said projection and having an aperture adapted to turn into and out of registration with said opening in the bottom of the bushing, and means upon the outer end of said projection for securing an impervious relation of said valve disk to the bottom inner surface of the bushing, of an outer valve portion covering said projection and securing means thereon adapted to receive a tap or faucet, said outer portion exposing said inclined grooves of the bushing and having an opening adapted to place the tap or faucet in communication with the said eccentric aperture of the valve, the upper end of said opening being stepped or enlarged to connect with the tap or faucet and overlying the said means for securing the valve disk on the boss or projection, and means detachably securing said outer valve portion to the valve disk in fixed relation thereto.

3. The combination with a faucet bung comprising a cup-like bushing having an eccentric opening in its bottom and inclined grooves in its side wall, and a valve in said bushing having an opening adapted to turn into and out of registration with said bottom opening, the outer end of said valve exposing said inclined grooves and having engaging means diametrically opposite its said opening, of a tap or faucet having a reduced end to enter said opening of the valve and opposite lugs adapted to engage the said inclined grooves, one of said lugs being adapted to engage the said engaging means on the valve to turn said valve with the tap or faucet.

DILLON BEEBE.

In the presence of—
HOWARD P. KING,
FRANCES E. BLODGETT.